US008969794B2

(12) United States Patent
Wylde et al.

(10) Patent No.: US 8,969,794 B2
(45) Date of Patent: Mar. 3, 2015

(54) MASS DEPENDENT AUTOMATIC GAIN CONTROL FOR MASS SPECTROMETER

(71) Applicant: 1st Detect Corporation, Austin, TX (US)

(72) Inventors: James Wylde, Oak Leaf, TX (US); David Rafferty, Webster, TX (US); Michael Spencer, Manvel, TX (US)

(73) Assignee: 1st Detect Corporation, Austin, TX (US)

( * ) Notice: Subject to any disclaimer, the term of this patent is extended or adjusted under 35 U.S.C. 154(b) by 0 days.

(21) Appl. No.: 14/206,524

(22) Filed: Mar. 12, 2014

(65) Prior Publication Data

US 2014/0299760 A1 Oct. 9, 2014

Related U.S. Application Data

(60) Provisional application No. 61/799,158, filed on Mar. 15, 2013.

(51) Int. Cl.

| | |
|---|---|
| ***H01J 49/26*** | (2006.01) |
| ***H01J 49/00*** | (2006.01) |
| ***B01D 59/44*** | (2006.01) |
| ***H01J 49/06*** | (2006.01) |

(52) U.S. Cl.

CPC *H01J 49/06* (2013.01); *H01J 49/26* (2013.01)
USPC ........... 250/281; 250/282; 250/283; 250/287; 250/292; 250/396 R; 250/397

(58) Field of Classification Search

CPC ..... H01J 49/004; H01J 49/061; H01J 49/062; H01J 49/4245; H01J 49/025; H01J 49/06; H01J 49/423; H01J 49/424; H01J 49/4265
USPC ...... 250/281, 282, 283, 292, 287, 396 R, 307
See application file for complete search history.

(56) References Cited

U.S. PATENT DOCUMENTS

| | | | |
|---|---|---|---|
| 2,773,212 | A | 12/1956 | Hall et al. |
| 4,540,884 | A | 9/1985 | Stafford et al. |

(Continued)

FOREIGN PATENT DOCUMENTS

| | | | |
|---|---|---|---|
| EP | 2 299 470 | A2 | 3/2011 |
| EP | 2 442 351 | A2 | 4/2012 |

*Primary Examiner* — Nikita Wells
(74) *Attorney, Agent, or Firm* — Finnegan, Henderson, Farabow, Garrett & Dunner LLP

(57) ABSTRACT

Systems and methods for automatic gain control in mass spectrometers are disclosed. An exemplary system may include a mass spectrometer, comprising a lens configured to receive a supply of ions, and a mass analyzer. The mass analyzer may include an ion trap for trapping the supplied ions. The mass analyzer may also include an ion detector for detecting ions that exit the ion trap. The lens may focus the ions non-uniformly based on mass of the ions to compensate for space charge effects reflected in a measurement output of the mass spectrometer. An exemplary method may include focusing an ion beam into a mass analyzer. The method may also include obtaining a mass spectrum and identifying a space charge characteristic based on the mass spectrum. The method may further include defocusing the lens based on the identified space charge characteristic, wherein defocusing the lens is configured to divert lighter ions away from the entrance aperture. The method may include obtaining a mass spectrum of a defocused ion beam generated from the sample.

10 Claims, 4 Drawing Sheets

(56) References Cited

U.S. PATENT DOCUMENTS

| | | | | |
|---|---|---|---|---|
| 4,771,172 | A | 9/1988 | Weber-Grabau et al. | |
| 5,324,939 | A | 6/1994 | Louris et al. | |
| 5,340,983 | A | 8/1994 | Deinzer et al. | |
| 5,479,012 | A | 12/1995 | Wells | |
| 5,493,115 | A | 2/1996 | Deinzer et al. | |
| 5,561,292 | A | 10/1996 | Buckley et al. | |
| 5,654,542 | A | 8/1997 | Schubert et al. | |
| 5,703,358 | A | 12/1997 | Hoekman et al. | |
| 5,710,427 | A | 1/1998 | Schubert et al. | |
| 6,294,780 | B1 | 9/2001 | Wells et al. | |
| 6,492,640 | B2 | 12/2002 | Terakura | |
| 6,600,154 | B1 | 7/2003 | Franzen et al. | |
| 6,627,876 | B2 * | 9/2003 | Hager | 250/282 |
| 6,878,929 | B2 | 4/2005 | Green et al. | |
| 6,888,133 | B2 | 5/2005 | Wells et al. | |
| 6,894,275 | B2 | 5/2005 | Green et al. | |
| 7,041,967 | B2 * | 5/2006 | Hager | 250/282 |
| 7,202,470 | B1 * | 4/2007 | Marriott | 250/281 |
| 7,230,232 | B2 | 6/2007 | Marriott | |
| 7,291,845 | B2 | 11/2007 | Moeller et al. | |
| 7,339,163 | B2 * | 3/2008 | Marriott | 250/281 |
| 7,459,677 | B2 | 12/2008 | Geist et al. | |
| 7,622,713 | B2 | 11/2009 | Quarmby et al. | |
| 7,820,961 | B2 | 10/2010 | Hashimoto et al. | |
| 7,858,933 | B2 | 12/2010 | Kawana et al. | |
| 7,939,810 | B2 | 5/2011 | Kawana et al. | |
| 7,960,692 | B2 | 6/2011 | Dobson et al. | |
| 8,334,505 | B2 | 12/2012 | Robinson et al. | |
| 8,334,506 | B2 | 12/2012 | Rafferty | |
| 8,426,805 | B2 | 4/2013 | McCauley | |
| 8,704,168 | B2 | 4/2014 | Rafferty | |
| 8,754,371 | B2 | 6/2014 | Hunter et al. | |
| 2009/0194681 | A1 | 8/2009 | McCauley | |
| 2012/0205534 | A1 | 8/2012 | Hunter et al. | |

* cited by examiner

MASS DEPENDENT AUTOMATIC GAIN CONTROL FOR MASS SPECTROMETER

PRIORITY CLAIM

This application is a non-provisional application claiming priority to U.S. Provisional Patent Application No. 61/799,158, filed Mar. 15, 2013 and titled "Mass Dependent Automatic Gain Control for Mass Spectrometer," all of which is incorporated herein by reference.

FIELD OF THE DISCLOSURE

The present disclosure relates generally to mass spectrometry and, more particularly, to systems and methods of mass-dependent automatic gain control.

BACKGROUND OF THE DISCLOSURE

Mass spectrometers are instruments used to analyze the mass and abundance of various chemical components in a sample. Mass spectrometers work by ionizing the molecules of a chemical sample, separating the resulting ions according to their mass-charge ratios (m/z), and then detecting the abundance of ions at each m/z. The resulting spectrum can be interpreted to reveal the relative amount of each chemical component in the sample based on the abundance of the mass fragments of these components.

Various mass spectrometers generate ions from the sample utilizing various methods, for example, electrospray ionization, atmospheric pressure chemical ionization, matrix-assisted laser desorption/ionization, and inductively coupled plasmas. In some situations, the ion source that generates the ions is located external to a mass analyzer. The ions are guided from the ion source into a mass analyzer, where the ions are separated based on mass. The ions then arrive at a detector that detects charge and/or current. Information based on the detected charge and/or current is then used to determine the quantity of ions of various masses.

One type of mass analyzer used for mass spectrometry is called a quadrupole ion trap. Quadrupole ion traps take several forms, including three-dimensional ion traps, linear ion traps, and cylindrical ion traps. The operation in all cases, however, remains essentially the same. DC and time-varying radio frequency (RF) electric signals are applied to the electrodes to create electric fields within the ion trap. These fields trap ions in a "cloud" within the central volume of the ion trap. By manipulating the amplitude and/or frequency of the electric fields, ions are selectively scanned out by being ejected from the ion trap in accordance with their m/z. A detector records the number of ejected ions at each m/z as they arrive.

Ion traps are optimized for a combination of speed, sensitivity, and resolution depending on the particular application. For a given instrument, an improvement in one category is usually made at the expense of another. For example, sensitivity can generally be increased by using a slower scan, and in the reverse, a scan can be performed faster at the expense of sensitivity. Similarly, sensitivity—especially to less abundant components of a sample—can be increased by trapping and scanning a larger total number of ions in a single scan. However, as the quantity of ions in the trap increases, the coulombic forces and collisions between the like-charged ions in the ion cloud increases, resulting in space charge effects. Mass spectrometers achieve resolution by ejecting all ions of the same m/z at close to the exact same moment. However, when space charge effects become significant, ions are ejected from the trap at different times. The result is broadening of spectral peaks and loss of resolution. Also, detectors used in mass spectrometers typically have a limited dynamic range, the difference between the lowest and highest concentration that can be detected. Concentrations lower than the lower bound are undetectable due to, for example, noise; and concentrations above the upper bound may saturate the detector. Additionally, mass analyzers may trap ions preferentially based on their mass, thus for a sample with a range of masses, larger ions may not be trapped as efficiently as lower masses.

There is a need for systems and methods for expanding the range of concentrations detectable by mass spectrometers. The present disclosure is directed to overcoming one or more of the problems set forth above and/or other problems of the prior art.

SUMMARY OF THE DISCLOSURE

Embodiments of the present disclosure relate to chemical analysis instruments, such as mass spectrometers, that utilize automatic gain control. Various embodiments of the disclosure may include one or more of the following aspects.

In one aspect, the present disclosure is directed to a mass spectrometer. The mass spectrometer may include a lens configured to receive a supply of ions, and a mass analyzer downstream of the lens. The mass analyzer may include an ion trap and an ion detector. Furthermore, the lens may focus a beam of the ions non-uniformly based on the mass of the ions to compensate for space charge effects reflected in a measurement output of the mass spectrometer.

In another aspect, the present disclosure is directed to a mass analyzing control system for analyzing the mass of a sample. The system may include one or more memories storing instructions. The system may also include one or more processor configured to execute the instructions to perform operations. The processor may obtain a mass spectrum of an ion beam generated from the sample and identify a space charge characteristic based on the mass spectrum. The processor may defocus the lens based on the mass spectrum or detector saturation, wherein defocusing the lens may correspond to preferentially defocusing away lighter ions. The processor may then obtain a mass spectrum of a defocused ion beam generated from the sample.

In yet another aspect, the present disclosure is directed to a method for analyzing the mass fragments of a sample. The method may include focusing an ion beam into a mass analyzer. The method may include obtaining a mass spectrum of the ion beam and identifying a space charge characteristic, or other mass dependent phenomena, based on the mass spectrum. The method may also include defocusing the lens based on the identified space charge characteristic, or other mass dependent phenomena, wherein defocusing the lens corresponds to preferentially defocusing away lighter ions. The method may further include obtaining a mass spectrum of a defocused ion beam generated from the sample.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings.

DETAILED DESCRIPTION OF THE EMBODIMENTS

Reference will now be made in detail to the embodiments of the present disclosure described below and illustrated in the accompanying drawings. Wherever possible, the same reference numbers will be used throughout the drawings to refer to same or like parts.

Figure 1:
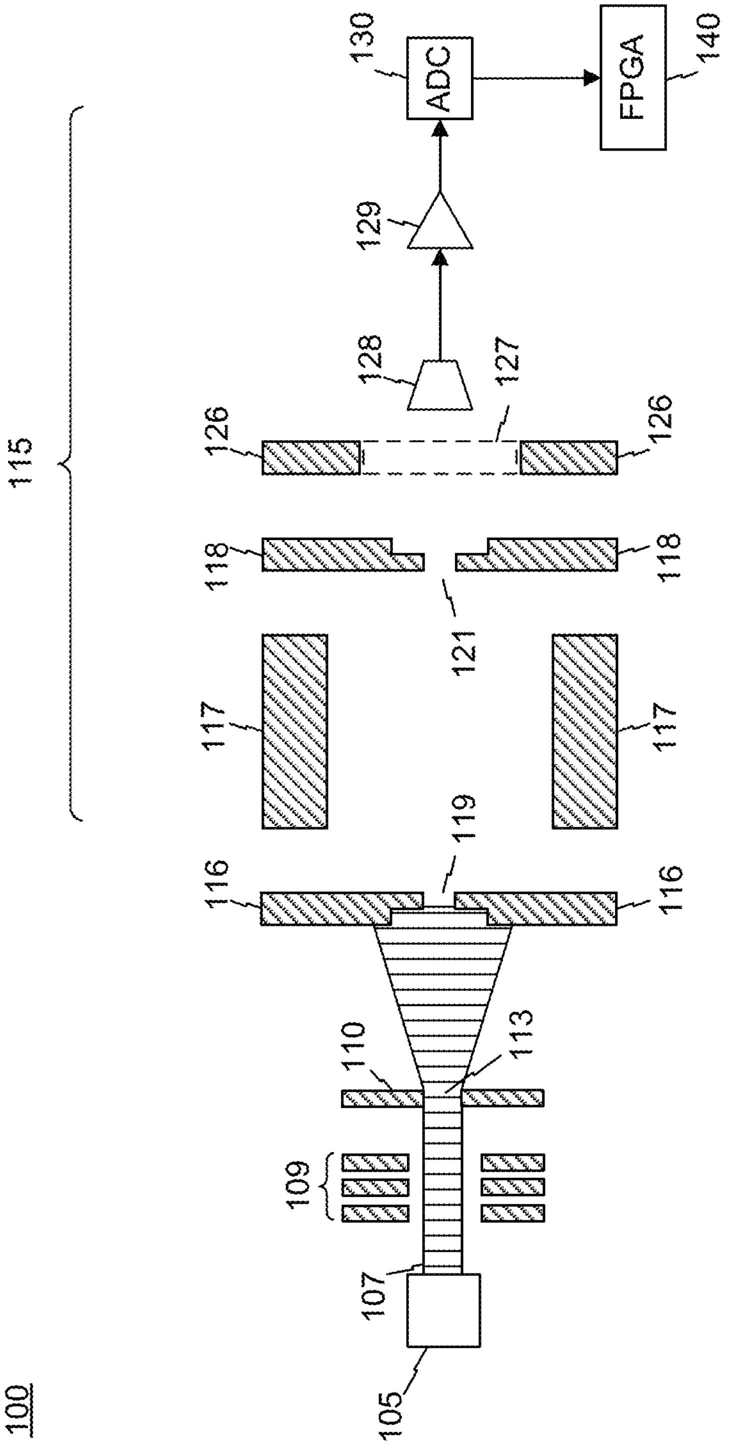
FIG. 1 is a pictorial illustration of a mass spectrometer according to some embodiments of the invention.

FIG. 1 is a schematic diagram of a mass spectrometer 100 according to an embodiment of the invention. Mass spectrometer 100 may include an ion source 105 for generating sample ions 107 from a sample and an ions lens 110 for focusing and defocusing ions 107. Mass spectrometer 100 may also include a mass analyzer 115. In some embodiments, mass analyzer 115 may be an ion trap-type mass analyzer. Mass analyzer 115 may receive ions 107 after they have been focused or defocused by ion lens 110. Eventually, ions 107 are scanned out of mass analyzer 115, detected by detector 128, and then converted into usable data by various components, such as an A/D converter 130 and a field-programmable gate array ("FPGA") 140.

In various embodiments, ion source 105 may be any apparatus that produces sample ions 107 by ionizing a sample that is introduced into mass spectrometer 100. For example, ion source 105 may include an electron ionization device comprising an electron filament, which is heated to a high enough temperature such that it emits energetic electrons. Ion source 105 may include an electron lens that focuses and accelerates the electrons into the sample, resulting in ionization of the sample and generation of sample ions 107. Alternatively, ion source 105 may be other types of devices that ionize samples by various methods, e.g., chemical ionization or inductively coupled plasma. In various embodiments, ion source 105 may generate ions 107 at a relatively high pressure, such as at around atmospheric pressure. In addition to ions 107, ion source 105 may contain a background gas, such as nitrogen, to which most of the pressure is attributed.

When ions 107 are emitted from ion source 105, ions 107 may begin to disperse unless focused by ion lenses. Ion lenses may be biased at various potentials to activate. The resulting electric field may result in electric forces on ions 107 that accordingly define the path of ions 107. In some embodiments, mass spectrometer 100 may include one or more ion lenses 109 that focus ions 107 into a beam. Mass spectrometer 100 may also include ion lens 110 that controls the degree to which the beam of ions 107 are focused or defocused before entering mass analyzer 115. The direction and acceleration of ions 107 passing through an aperture 113 of ion lens 110 may be controlled based on the voltage applied to ion lens 110. In addition, changing the voltage applied to lens 110 may affect the cross-sectional area of the ion beam. Accordingly, the proportion of ions 107 that pass through lens 110 into mass analyzer 115 may vary based partly on the voltage applied to lens 110. Lens 110 may then act as a voltage-controlled gate for controlling the number of ions 107 that enter the mass analyzer 115.

Mass analyzer 115 may include a first end cap electrode 116, a ring electrode 117, and a second end cap electrode 118. First end cap electrode 116 may have an aperture 119, through which ions 107 are received by mass analyzer 115. By applying voltages to end caps 116 and 118, and a voltage to the ring electrode 117, which may be DC, AC, or combination of AC and DC voltages, an electric field may be generated in mass analyzer 115. By appropriately setting the field strength, shape, and frequency of the field, ions 107 that enter mass analyzer 115 may be trapped as an ion cloud within mass analyzer 115. However, ions 107 are not trapped statically in the ion trap. That is, ions 107 may continue to move within the ion cloud, based on the generated RF fields, electrostatic interactions among ions 107, and collisions with background gas particles.

The strength of the RF field and/or the frequency of the RF field may then be adjusted to selectively scan out ions 107 based on the mass (more specifically, the mass-to-charge ratio) of the ions. Ions 107 may be scanned out through an aperture 121 in second end cap 118, and received by ion detector 128. In some embodiments, a focusing lens 126 may precede ion detector 128. Focusing lens may include an aperture 127 that is covered with a screen or grate that shields mass analyzer 115 from strong electric fields generated by a high voltage on ion detector 128. For example, ion detector 128 may be biased with a voltage on the order of −2,000 V. Ion detector 128 may receive ions 107 and generate a detection signal. The output of ion detector 128 may feed into an ion amplifier 129, which may be positioned in close proximity to ion detector 128. Ion amplifier 129 may serve to buffer the output of the ion detector 128, and allow for transmission to A/D converter 130 via a low-impedance signal line that is less susceptible to electromagnetic interference than the output of ion detector 128. An A/D converter 130 may translate the analog output of the ion amplifier 129 into a digital signal to be read by field-programmable gate array ("FPGA") 140 and eventually processed into an output spectrum to be read by a user or stored for future use. The output spectrum may depict the number of ions 107 as a function of mass. In some embodiments, the A/D converter 130 and FPGA 140 may be combined into a single complex device such as a digital signal processor ("DSP"), microprocessor, or any combination of analog or digital components known in the art.

In various embodiments, the resolution of the output spectrum may be affected by space charge or other effects that affect the resolution of the mass spectrometer 100. For example, space charge effects are due to numerous like-charged ions 107 being confined to a limited space. In various situations, the electric fields generated within mass analyzer 115 may be working to keep ions 107 close together at the center. But due to the closeness of so many like-charged ions 107, ions 107 may experience counteracting electrostatic repulsive forces. Such space charge effects may introduce irregularities to the motion of ions 107 within the ion cloud and subsequently alter the resulting mass spectrum measured by detector 128. In addition, some effects may preferentially affect ions based upon their mass. For example, collisions with neutral species such as background gasses will affect the trajectory of smaller ions more significantly than larger ions.

Figure 2A:
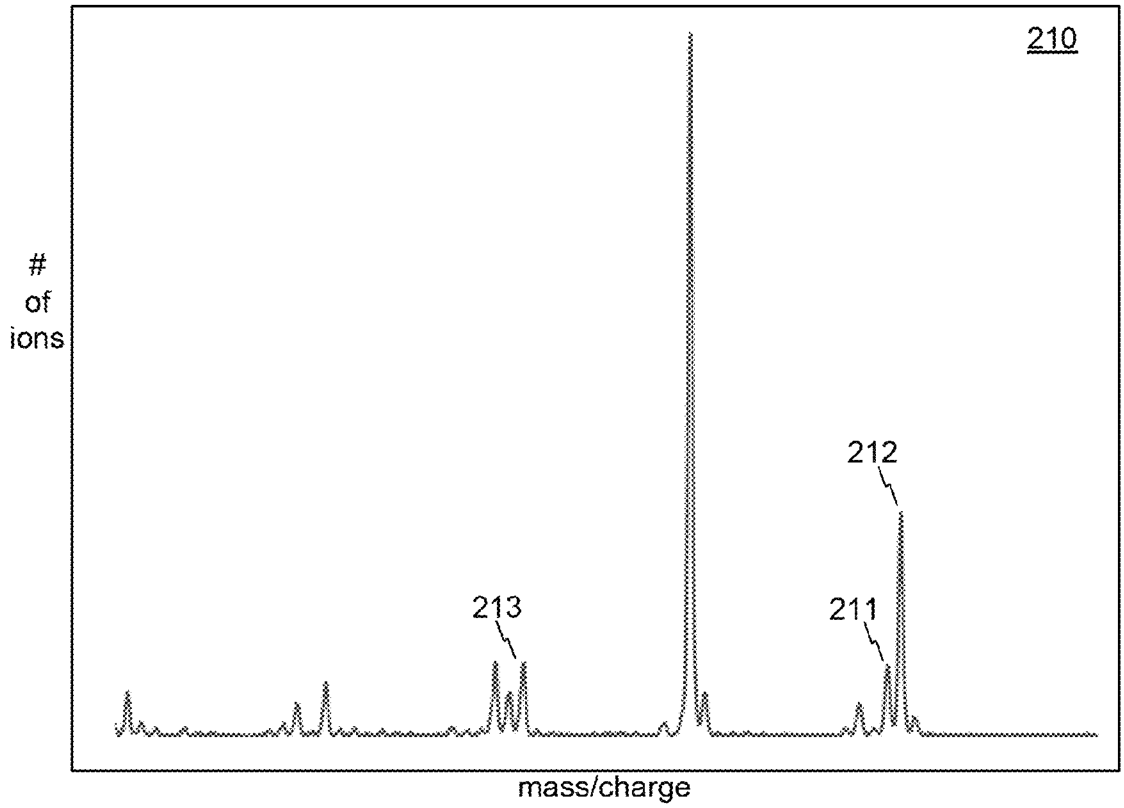
FIGS. 2A and 2B depict exemplary spectra with and without space charge effects.
Figure 2B:
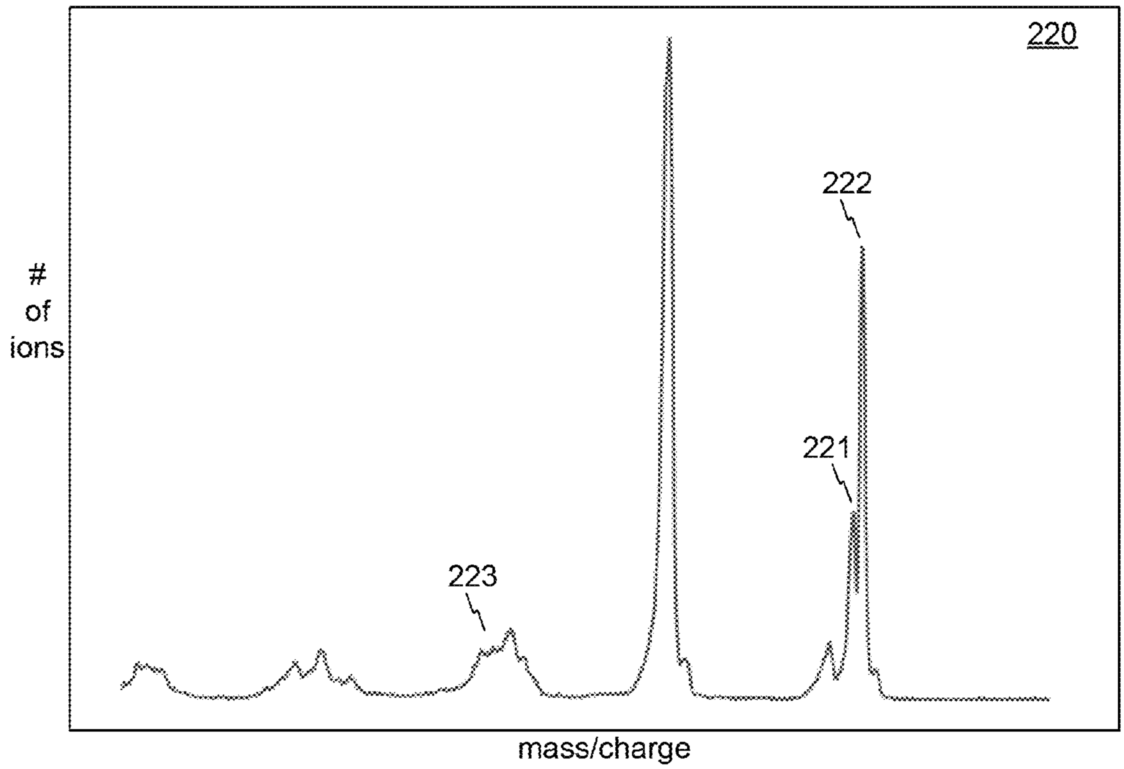

FIGS. 2A and 2B show exemplary spectra generated by mass spectrometer 100 without space charge effects and with space charge effects. In FIG. 2A, peaks 211 and 212 indicate the presence of two isotopes of a same ion. In the absence of space charge effects, the peaks are easily discernible. In various embodiments, as the quantity of ions trapped in mass analyzer 115 increases, space charge effects begin to manifest such that spectral peaks widen and isotopes blur together. For example, in FIG. 2B, the midpoint between peaks 221 and 222, which represent the same isotopes as peaks 211 and 212 in FIG. 2A, no longer drops back to the baseline.

FIG. 2B also reveals that space charge effects are more pronounced at lower masses. The loss in resolution from peak 212 to 222 is not as severe as the loss of resolution from 213 to 223, where identification of isotopes, and in fact the identity of the main peak, has become impossible. There are various possible reasons for space charge effects manifesting more heavily at lower masses. One reason may be due to the fact that ions are scanned out of mass analyzer 115 in order from low mass to high mass. Low mass ions are scanned out of mass analyzer 115 when the ion trap is still full. Accordingly, space charge effects are more severe due to the higher number of charged ions still in the ion trap contributing to space charge. By the time higher mass ions are scanned out of the ion trap towards the end of the scan, only higher mass ions are left in the ion trap. Because the number of charged particles has reduced, space charge effects may likewise be reduced. Another reason that space charge effects may manifesto a greater extent at the lower end of a mass spectrum may be due to greater deflection of lighter masses as compared to heavier masses. That is, as various ions move towards each other and then repel each other, due to the electrostatic repulsive forces, the heavier ions may displace a small distance from the center of the ion trap, while the lighter ions may displace a much larger distance from the center. A useful analogy may be to consider a ping pong ball and a bowling ball. If a ping pong ball and a bowling ball collide, the ping pong ball tends to ricochet off the bowling ball with substantial speed and large deflection. The bowling ball, on the other hand, barely moves as result of the interaction with the ping pong ball. Similarly, as all of the ions 107 in mass analyzer 115 move about within the center and experience near-collisions with each other, lighter ions may be deflected more from the center of mass analyzer 115 as compared with heavier ions. The more that a set of ions 107 of the same mass are dispersed within mass analyzer 115, the less likely that all of the ions are successfully scanned out simultaneously. As a result, spectral broadening occurs in the measurement. On the other hand, the more that trajectory of the set of ions 107 are controlled by the electrical signals applied to mass analyzer 115 and less by space charge effects, the more likely that all of the ions are scanned out near simultaneously and that a clean spectral peak can be obtained.

Figure 3C:
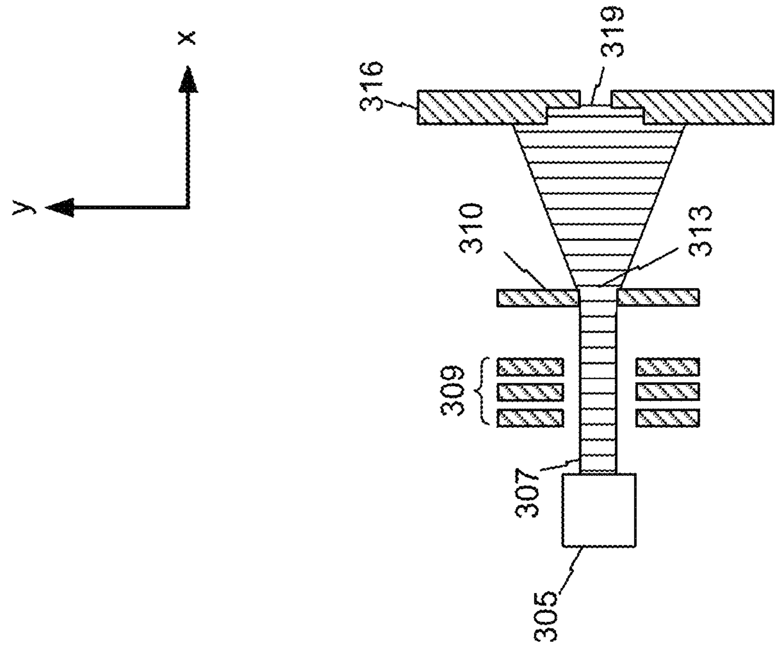
FIGS. 3A, 3B, and 3C depict simplified flight paths of ions for various voltages applied to an ion lens.
Figure 3A:
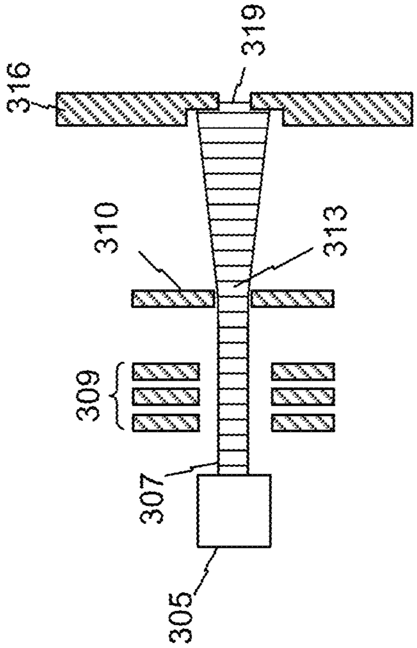
Figure 3B:
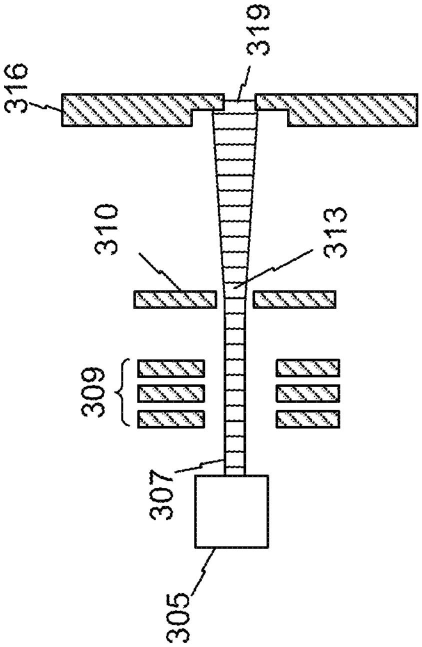

FIGS. 3A, 3B, and 3C illustrate varying degrees of focusing by ion lens 310. Such adjustments may be utilized to control the extent of space charge effects exhibited in a measured spectrum, according to some embodiments. In FIG. 3A, ion source 305 may generate ions 307, which then may be focused by intermediary ion lenses 309. After emerging from ion lenses 309, ions 307 may continue to travel towards first end cap 316 of a mass analyzer, passing through aperture 313 of ion lens 310 along the way. A voltage may be applied to ion lens 310 such that the beam of ions 307 is focused or defocused accordingly. In some embodiments, for positive ions 307, the applied voltage may be a negative voltage that results in some of ions 307 passing through aperture 319 while others hit first end cap 316. In FIGS. 3B and 3C, the voltage applied to ion lens 310 may be adjusted such that the beam of ions 307 becomes relatively more or less focused. For example, in FIG. 3B, the voltage applied to ion lens 310 may be adjusted to be more negative than in FIG. 3A. As a result, ion lens 310 may focus ions 307 into a narrower beam, and subsequently, a higher proportion of ions 307 may pass through aperture 319. In FIG. 3C, the voltage applied to ion lens 310 may be adjusted to be less negative than in FIG. 3A. As a result, ion lens 307 may defocus the beam of ions 307 such that a lower proportion of ions 307 pass through aperture 319. The number of ions 307 that enter the ion trap may therefore be reduced. In various other embodiments, when ion lens 310 is adjusted to be more positively biased, the beam of ions is defocused, and when ions lens 310 is adjusted to be more negatively biased, the beam of ions is focused.

Figure 4:
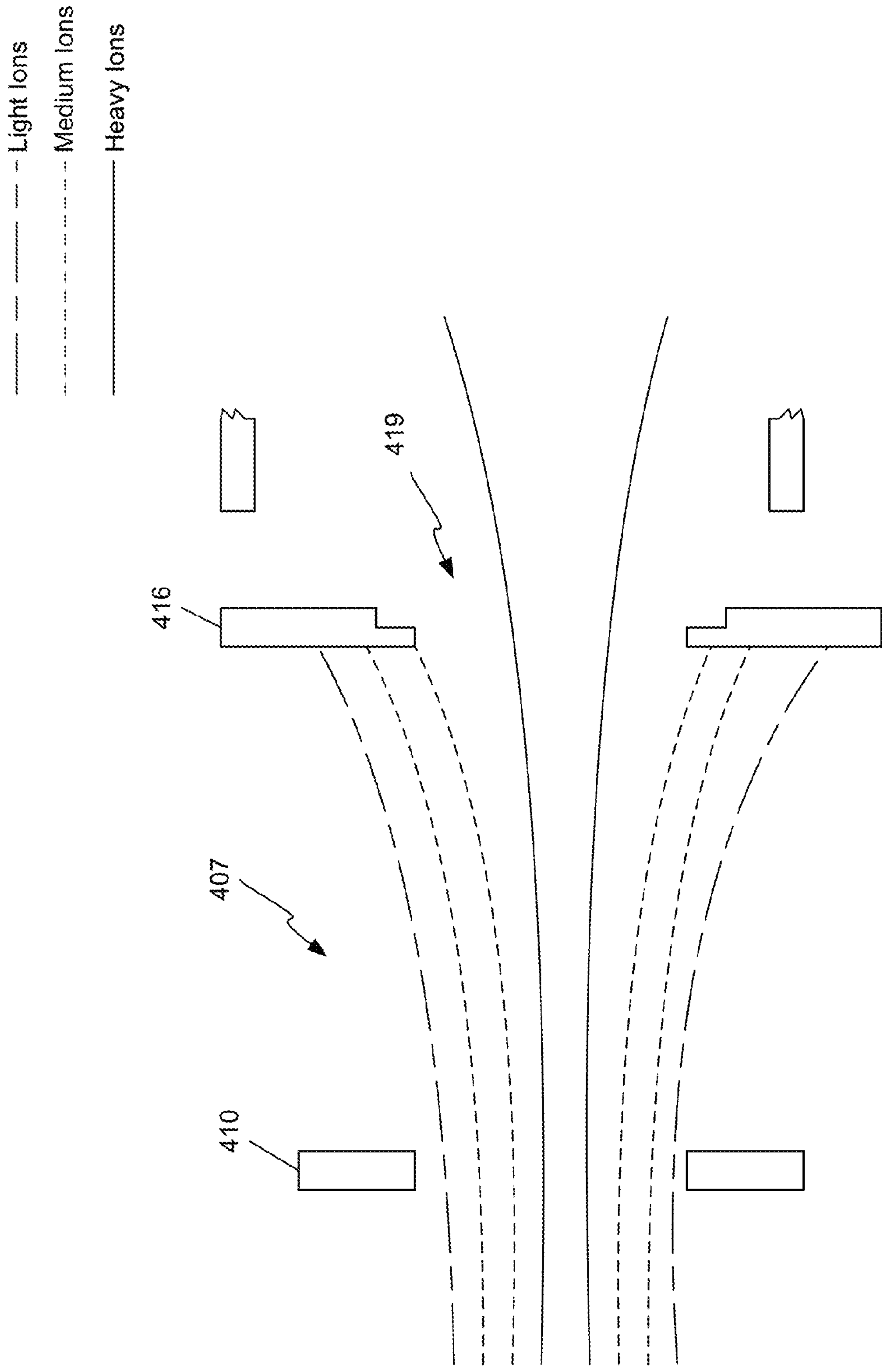
FIG. 4 depicts another view of simplified flight paths of ions defocused preferentially by mass.

Furthermore, the trajectory of the ion will be affected by the electric field created by lens 310 according to the vector force applied to the ion:

$$\vec{F}=q\vec{E}$$

where F is the vector force applied to the ion, q is the charge on the ion, and E is the vector electric field strength. The change in the trajectory of the ion will be defined by:

$$\vec{F}=m\vec{a}$$

where F is the vector force from the applied electric field, m is the mass of the ion, and a is the vector acceleration. Since the force applied to the ion is defined only by the electric field strength and the charge, which may be similar for like ions; and the change in trajectory is dependent only upon the mass and applied acceleration, the change in ion trajectory will depend upon the mass of the ion, provided that the ions are travelling at relatively the same velocity. This dependence is shown in FIG. 4, which is a magnified view of ion beam 407 passing through ion lens 410 and arriving at aperture 419 of first end cap 416. FIG. 4 shows the trajectories of exemplary light, medium, and heavy ion masses, wherein ion lens 410 preferentially defocuses away ions based on mass. Thus, referring back to FIG. 3, ion lens 310 may defocus ions 307 preferentially based on the mass of ions 307. That is, lighter ions may tend to be deflected away from the central axis of the beam of ions 307 arriving at aperture 319. However, heavier ions may not be deflected as much. Therefore, in FIG. 3C, ions 307 that arrive inside the ion trap may preferentially include heavier ions 307. That is, lighter ions 307 may be deflected such that they are at the edge of the beam and hit the surface of first end cap 316 instead of passing through aperture 319. In various embodiments, by preferentially defocusing the beam of ions 307, the number of lighter ions, which are the ions that exhibit more space charge effects, is reduced in the ion trap. In such manner, the overall space charge effects exhibited by the measured spectrum may be improved.

Another way to understand this improvement on space charge effects may be as follows. Lens 310 may preferentially focus and defocus lighter ions 307. A plot of the response of the lens, such as attenuation for a given applied voltage as a function of mass, would have a negative slope. This negative slope is due to the fact that lighter ions are defocused and deflected more than the heavier ions. In addition, a plot of the ion trap with respect to space charge, such as resilience to space charge effects as a function of mass, would have a positive slope. This positive slope is due to, as discussed above, space charge effects affecting lighter mass ions more than heavier mass ions. If these two plots are added, the mass-dependent space charge effects may cancel, to a first order approximation.

In various embodiments, an exemplary method for reducing space charge effects exhibited in a measured spectrum may be as follows. The ion trap may be loaded with ions 307. The resulting spectrum may exhibit space charge effects at the lower end of the mass spectrum. The voltage applied to ion lens 310 may then be adjusted such that the beam of ions 307 is defocused away from aperture 319, preferentially for the lighter ions. Because the lighter ions have been preferentially defocused away, less of the lighter ions may enter the ion trap via aperture 319. As a result, overall space charge effects may be reduced.

In some embodiments, the resulting spectrum after the beam of ions 307 is defocused may show an improvement with respect to space charge effects. However, the proportion of masses trapped in the ion trap and subsequently detected by the detector may be skewed, since lighter ions 307 are preferentially defocused away. A compensation for such spectral skew may be performed by various methods and algorithms after the spectrum has been obtained. For example, a computing processor (not shown) may execute instructions stored in memory for computationally adjusting the measured spectrum. As another example, another run of measurements may be performed, where lighter ions are preferentially focused into the ion trap. The resulting mass spectrum may then be combined with the first mass spectrum to derive a new mass spectrum with spectral skew removed and reduced space charge effects.

In some other embodiments, the beam of ions 307 may be defocused without preference based on mass. For example, ions 307 may be generated and/or manipulated to have uniform momentum. The momentum of each ion 307 is defined by:

$$\vec{p}=m\vec{v}$$

where p is the vector momentum of the ion, m is the mass of the ion, and v is the vector velocity of the ion. Because ions 307 may have different masses, different ions 307 will travel at different velocities in order for ions 307 to have uniform momentum. Heavier ions may move at a slower velocity while lighter ions may move at a faster velocity. As ions 307 pass through aperture 313 in ion lens 310, the electrostatic force generated by ion lens 310 may focus or defocus ions 307. In some embodiments, as ions 307 travel from ion lens 310 to end cap 316, the lighter ions will be accelerated by ion lens 310 in the y-direction (perpendicular to the axis connecting aperture 313 and aperture 319) more than the heavier ions. As discussed above, in situations where ions 307 have uniform velocity, the larger acceleration causes larger deflection of the lighter ions. However, when ions 307 enter ion lens 310 with uniform momentum, the lighter ions may be traveling at a faster velocity than the heavier ions. Therefore, even if the lighter ions experience greater acceleration in the y-direction, the lighter ions also traverse the distance between ion lens 310 and end cap 316 more quickly. Accordingly, the lighter ions traverse this distance in less time, which results in smaller deflections in the y-direction before the lighter ions arrive at end cap 316. The heavier ions, on the other hand, travel the distance between ion lens 310 and end cap 316 more slowly, allowing for more time during which the heavier ions are deflected in the y-direction. In some embodiments, the fact that lighter ions are accelerated in the y-direction more than the heavier ions, but the heavier ions take longer to arrive at end cap 316 than the lighter ions may result in lighter ions and heavier ions being deflected by relatively the same amount. Therefore, ions 307 of various masses may be focused and defocused by ion lens 310 without preference based on mass.

In embodiments that utilize ions 307 with uniform momentum, ion lens 310 may focus and defocus the beam of ions 307 such that a greater or lesser proportion of ions 307 enter mass analyzer. The group of ions 307 that enter the mass analyzer may maintain the same proportion of the various masses of ions 307 that is originally present in the beam that is focused or defocused by ion lens 310. By reducing the number of ions 307 that are trapped simultaneously in the mass analyzer, space charge effects may be reduced.

It will be apparent to those skilled in the art that various modifications and variations can be made to the disclosed systems and methods. Other embodiments will be apparent to those skilled in the art from consideration of the specification and practice of the disclosed systems and methods. It is intended that the specification and examples be considered as exemplary only, with a true scope being indicated by the following claims and their equivalents.

What is claimed is:

1. A mass spectrometer, comprising:

a lens configured to receive a supply of ions; and a mass analyzer downstream of the lens, the mass analyzer having:

an ion trap for trapping the supplied ions; and an ion detector for detecting ions that exit the ion trap, wherein the lens is configured to focus the ions non-uniformly based on the mass of the ions to compensate for space charge effects reflected in a measurement output of the mass spectrometer, and wherein the lens is configured to defocus lighter ions away from an entrance into the ion trap, such that an output of the ion detector has reduced space charge effects.

2. A mass analyzing control system for analyzing the mass of a sample, the system comprising:

a memory storing instructions;

a processor configured to execute the instructions to perform operations, including:

obtaining a mass spectrum of an ion beam generated from the sample;

identifying a space charge characteristic based on the mass spectrum;

defocusing a lens based on the identified space charge characteristics, wherein the lens is configured to adjustably focus or defocus a supply of ions being provided towards an entrance aperture of an ion trap, wherein defocusing the lens is configured to cause lighter ions to divert away from the entrance aperture; and obtaining a mass spectrum of a defocused ion beam generated from the sample.

3. The control system of claim 2, wherein the processor is further configured to:

defocus the lens by adjusting a voltage across the electrodes of the lens.

4. The control system of claim 2, wherein the processor is further configured to:

determine a mass dependent spectral skew in the mass spectrum as a result of preferentially defocusing away lighter ions; and computationally compensating for the spectral skew.

5. A method for analyzing the mass of a sample, comprising:

focusing an ion beam into an entrance aperture of a mass analyzer;

obtaining a mass spectrum of the ion beam;

identifying a space charge characteristic based on the mass spectrum;

defocusing the lens based on the identified space charge characteristic, wherein defocusing the lens is configured to divert lighter ions away from the entrance aperture; and obtaining a mass spectrum of a defocused ion beam generated from the sample.

6. The method of claim 5, further comprising:

defocusing the lens by adjusting the voltage across the electrodes of the lens.

7. The method of claim 5, further comprising:

determining a mass dependent spectral skew in the mass spectrum as a result of preferentially defocusing away lighter ions; and computationally compensating for the spectral skew.

8. A mass spectrometer, comprising:

a lens configured to receive a supply of ions having uniform momentum; and a mass analyzer downstream of the lens, the mass analyzer having:

an ion trap for trapping the supplied ions; and an ion detector for detecting ions that exit the ion trap, wherein the lens is configured to defocus the ions uniformly based on mass to compensate for space charge effects reflected in a measurement output of the mass spectrometer, and wherein the lens is configured to defocus lighter ions away from an entrance into the ion trap, such that an output of the ion detector has reduced space charge effects.

9. The mass spectrometer of claim 8, further comprising:

an ion source for generating the supply of ions having uniform momentum.

10. A method for analyzing the mass of a sample, comprising:

focusing an ion beam into an entrance aperture of a mass analyzer, wherein the ions in the ion beam have uniform momentum;

obtaining a mass spectrum of the ion beam;

identifying a space charge characteristic based on the mass spectrum;

defocusing the lens based on the identified space charge characteristic, wherein defocusing the lens is configured to divert ions away from the entrance aperture uniformly based on mass; and obtaining a mass spectrum of a defocused ion beam generated from the sample.

* * * * *